United States Patent [19]

Ward et al.

[11] Patent Number: 4,790,927

[45] Date of Patent: * Dec. 13, 1988

[54] PROCESS FOR SIMULTANEOUS HYDROTREATING AND HYDRODEWAXING OF HYDROCARBONS

[75] Inventors: John W. Ward, Yorba Linda, Calif.; Timothy L. Carlson, Palisade, Colo.

[73] Assignee: Union Oil Company of California, Los Angeles, Calif.

[*] Notice: The portion of the term of this patent subsequent to Jan. 31, 2001 has been disclaimed.

[21] Appl. No.: 569,297

[22] Filed: Jan. 9, 1984

Related U.S. Application Data

[60] Division of Ser. No. 267,247, May 26, 1981, Pat. No. 4,428,862, which is a continuation-in-part of Ser. No. 172,868, Jul. 28, 1980, abandoned.

[51] Int. Cl.$^4$ .................... C10G 45/08; C10G 45/12; C10G 45/60; C10G 65/04
[52] U.S. Cl. ..................................... 208/89; 208/110; 208/216 R; 208/254 H
[58] Field of Search ................ 208/89, 109, 110, 111, 208/216 R, 254 H, 120, 119, 118

[56] References Cited

U.S. PATENT DOCUMENTS

| | | | |
|---|---|---|---|
| Re. 28,398 | 4/1975 | Chen et al. | 208/111 |
| Re. 29,948 | 3/1979 | Dwyer et al. | 208/110 |
| 2,876,072 | 3/1959 | Coes, Jr. | |
| 3,140,322 | 7/1964 | Frilette et al. | 260/667 |
| 3,442,795 | 5/1969 | Kerr et al. | 208/120 |
| 3,487,005 | 6/1970 | Egan et al. | 208/59 |
| 3,493,341 | 2/1970 | Le Page et al. | 502/82 |
| 3,506,400 | 4/1970 | Eberly, Jr. et al. | 423/339 |
| 3,506,568 | 4/1970 | Annesser et al. | 208/89 |
| 3,516,925 | 6/1970 | Lawrence et al. | 208/111 |
| 3,556,725 | 1/1971 | Chiola et al. | 423/339 |
| 3,640,681 | 2/1972 | Pickert | 423/328 |
| 3,699,036 | 10/1972 | Hass et al. | 208/111 |
| 3,700,585 | 10/1972 | Chen et al. | 208/111 |
| 3,702,886 | 11/1972 | Argauer et al. | 423/328 |
| 3,729,409 | 4/1973 | Chen | 208/135 |
| 3,730,878 | 5/1973 | Pollitzer | 208/143 |
| 3,755,138 | 8/1973 | Chen et al. | 208/33 |
| 3,755,145 | 8/1973 | Orkin | 208/111 |
| 3,758,402 | 9/1973 | Oleck et al. | 208/111 |
| 3,758,403 | 9/1973 | Rosinski et al. | 208/120 |
| 3,835,027 | 9/1974 | Ward | 208/111 |
| 3,849,290 | 11/1974 | Wise et al. | 208/66 |
| 3,849,463 | 11/1974 | Dwyer et al. | 208/111 |
| 3,852,189 | 12/1974 | Chen et al. | 208/120 |
| 3,853,749 | 12/1974 | Espenscheid et al. | 208/307 |
| 3,884,835 | 5/1975 | Vaughan | 502/82 |
| 3,891,540 | 6/1975 | Demmel et al. | 208/77 |
| 3,893,906 | 7/1975 | Garwood et al. | 208/111 |
| 3,894,938 | 7/1975 | Gorring et al. | 208/97 |
| 3,894,939 | 7/1975 | Garwood et al. | 208/111 |
| 3,926,782 | 12/1975 | Plank et al. | 208/135 |
| 3,941,871 | 3/1976 | Dwyer et al. | 423/326 |
| 3,948,758 | 4/1976 | Bonacci et al. | 208/92 |
| 3,956,102 | 5/1976 | Chen et al. | 208/93 |
| 3,957,621 | 5/1976 | Bonacci et al. | 208/60 |
| 3,960,705 | 6/1976 | Garwood et al. | 208/111 |
| 3,962,135 | 6/1976 | Alafandi | 502/82 |
| 3,968,024 | 7/1976 | Gorring et al. | 208/111 |
| 3,980,550 | 9/1976 | Gorring et al. | 208/111 |
| 4,044,063 | 8/1977 | Ireland et al. | 208/79 |
| 4,054,510 | 10/1977 | Parker | 208/120 |
| 4,061,717 | 12/1977 | Kerr et al. | 423/329 |
| 4,061,724 | 12/1977 | Grose et al. | 423/335 |
| 4,067,797 | 1/1978 | Chen et al. | 208/15 |
| 4,073,865 | 2/1978 | Flanigen et al. | 423/339 |
| 4,088,605 | 5/1978 | Rollmann | 423/328 |
| 4,091,007 | 5/1978 | Dwyer et al. | 423/118 |
| 4,104,294 | 8/1978 | Grose et al. | 260/448 |
| 4,137,148 | 1/1979 | Gillespie et al. | 208/87 |
| 4,139,600 | 2/1979 | Rollmann et al. | 423/329 |
| 4,148,713 | 4/1979 | Rollmann | 208/111 |
| 4,149,960 | 4/1979 | Garwood et al. | 208/111 |
| 4,153,540 | 5/1979 | Gorring et al. | 208/89 |
| 4,170,544 | 10/1979 | Miller | 208/96 |
| 4,176,050 | 11/1979 | Chen et al. | 208/111 |
| 4,181,598 | 1/1980 | Gillespie et al. | 208/58 |
| 4,192,734 | 3/1980 | Pavlica et al. | 208/80 |
| 4,208,305 | 6/1980 | Kouwenhoven et al. | 423/326 |
| 4,211,635 | 7/1980 | Chen | 208/93 |
| 4,229,282 | 10/1980 | Peters et al. | 208/111 |
| 4,234,549 | 11/1980 | Stanley et al. | 423/245 |
| 4,238,318 | 12/1980 | Kouwenhoven et al. | 208/120 |
| 4,238,320 | 12/1980 | Cronauer et al. | 208/99 |
| 4,242,233 | 12/1980 | Ball et al. | 423/329 |
| 4,247,388 | 1/1981 | Banta et al. | 208/111 |
| 4,257,872 | 3/1981 | La Pierre et al. | 208/59 |
| 4,257,885 | 3/1981 | Grose et al. | 55/75 |
| 4,259,174 | 3/1981 | Chen et al. | 208/111 |

(List continued on next page.)

FOREIGN PATENT DOCUMENTS

| 35807 | 9/1981 | European Pat. Off. |
| 902437 | 8/1962 | United Kingdom |
| 2056961A | 3/1981 | United Kingdom |

OTHER PUBLICATIONS

Randle et al., Synthetic Crude Oil and Transportation Fuels from Shale Oil, API, 46th Midyear Refining Meeting, May 14, 1981.

"Catalytic Properties of Attrition Ground Silica" by Hatcher, Jr., et al., Set Forth in *Journal of Catalysis*, vol. 38, pp. 73 to 79 (1975).

"Silicalite, a New Hydrophobic Crystalline Silica Molecular Sieve" by Flanigen et al., in *Nature*, vol. 271, pp. 512 to 516, Feb. 9, 1978.

(List continued on next page.)

*Primary Examiner*—Olik Chaudhuri
*Attorney, Agent, or Firm*—Gregory F. Wirzbicki; Michael H. Laird

[57] ABSTRACT

Waxy shale oil feeds containing organonitrogen and/or organosulfur components are contacted with a catalyst comprising a Group VIB metal component on a support containing silicalite and a porous refractory oxide under conditions of elevated temperature and pressure and in the presence of hydrogen so as to simultaneously reduce its pour point and its organosulfur and/or organonitrogen content.

102 Claims, No Drawings

U.S. PATENT DOCUMENTS

| | | | |
|---|---|---|---|
| 4,263,129 | 4/1981 | Chen et al. | 208/111 |
| 4,266,672 | 5/1981 | Van Nordstrand | 208/120 |
| 4,270,017 | 5/1981 | Young | 585/437 |
| 4,277,635 | 7/1981 | Oulman et al. | 568/916 |
| 4,283,271 | 8/1981 | Garwood et al. | 208/59 |
| 4,283,272 | 8/1981 | Garwood et al. | 208/59 |
| 4,283,306 | 8/1981 | Herkes | 423/328 |
| 4,284,529 | 8/1981 | Shihabi | 208/111 |
| 4,297,328 | 10/1981 | Ritscher et al. | 423/213.2 |
| 4,299,808 | 11/1981 | Klotz | 585/480 |
| 4,305,808 | 12/1981 | Bowes et al. | 208/111 |
| 4,309,275 | 1/1982 | Mulaskey | 208/109 |
| 4,309,276 | 1/1982 | Miller | 208/109 |
| 4,309,280 | 1/1982 | Rosinski et al. | 208/120 |
| 4,310,440 | 1/1982 | Wilson et al. | 423/305 |
| 4,313,817 | 2/1982 | Mayer et al. | 208/89 |
| 4,325,929 | 4/1982 | Young | 423/339 |
| 4,330,396 | 5/1982 | Miller | 208/136 |
| 4,332,699 | 6/1982 | Nozemack | 502/82 |
| 4,340,503 | 7/1982 | Rao et al. | 518/719 |
| 4,342,641 | 8/1982 | Reif et al. | 208/89 |
| 4,344,840 | 8/1982 | Kunesh | 208/59 |
| 4,344,927 | 8/1982 | Young | 423/339 |
| 4,346,021 | 8/1982 | Ball et al. | 423/328 |
| 4,354,924 | 10/1982 | Miller | 208/120 |
| 4,356,079 | 10/1982 | Desaau | 208/10 |
| 4,358,362 | 11/1982 | Smith et al. | 208/91 |
| 4,358,363 | 11/1982 | Smith | 208/91 |
| 4,359,378 | 11/1982 | Scott | 208/120 |
| 4,361,477 | 11/1982 | Miller | 208/67 |
| 4,362,653 | 12/1982 | Robinson | 502/242 |
| 4,370,219 | 1/1983 | Miller | 208/59 |
| 4,377,468 | 3/1983 | La Pierre et al. | 208/111 |
| 4,403,044 | 9/1983 | Post et al. | 518/714 |
| 4,416,766 | 11/1983 | Mulaskey | 208/135 |
| 4,428,825 | 1/1984 | Ward et al. | 208/109 |
| 4,441,991 | 4/1984 | Dwyer et al. | 208/111 |
| 4,443,329 | 4/1984 | Eberly, Jr. et al. | 208/111 |
| 4,476,011 | 10/1984 | Tait et al. | 208/111 |
| 4,495,061 | 1/1985 | Mayer et al. | 208/89 |

OTHER PUBLICATIONS

"Silicalite-2, a Silica Analogue of the Aluminosilicate Zeolite ZSM-11" by Bibby et al., in Nature, vol. 380, pp. 664 to 665, Aug. 23, 1979.

"Reactions on ZSM-5 Type Zeolite Catalysts" by Anderson et al., in *Journal of Catalysis*, vol. 58, pp. 114 to 130 (Jun. 15, 1979).

"Catalyst Development for Jet Fuel from Shale Oil" by A. M. Tait and A. L. Hensley in *Jet Fuel Looks to Shale Oil: 1980 Technology Review* by Dr. Herbert R. Lander of Aero Propulsion Laboratory, Wright-Patterson Air Force Base, Ohio, May 1981, Reporting Proceedings of a Sumposium Held in Cincinnati, Ohio, on Nov. 19, 20, 1980.

"Evaluation of Methods to Produce Aviation Turbine Fuels from Synthetic Crude Oils Phase 1" by Exxon Research and Engineering Company Released by the Air Force Aero Propulsion Laboratory, Wright-Patterson Air Force Base, Ohio, Technical Report AFAPL-TR-75-10 (March, 1975).

"Zoned Aluminum Distribution in Synthetic Zeolite ZSM-5" by Ballmoos et al., in *Nature*, vol. 289, Feb. 26, 1981, pp. 782 and 783.

"Catalytic Dewaxing Process Improved" by Donnelly et al., in *Oil and Gas Journal*, Oct. 27, 1980, pp. 77–82.

"Chemical and Physical Properties of the ZSM-5 Substitutional Series" by Olson et al., *Journal of Catalysis*, vol. 16, pp. 390 to 396 (1980).

"Pentasil Family of High Silica Crystalline Materials" by Kokotailo et al., in *The Properties and Applications of Zeolites*, ed. R. P. Townsend, the Proceedings of a Conference Organized Jointly by the Inorganic Chemicals Group of the Chemical Society and the Society of Chemical Industry (Burlington House, London) Apr. 18-20 1979.

"Recent Advances in the Production of Fuels and Chemicals Over Zeolite Catalysts" by S. L. Meisel, J. P. McCullough, C. H. Lechthaler, and P. B. Weisz, American Chemical Society National Meeting, Chicago, Ill., Aug. 1977, Division Industrial & Engineering Chemistry, Paper No. 26.

"Make Olefins from Syn Gas" by Rao et al., Set Forth in *Hydrocarbon Processing*, Nov. 1980, pp. 139–142.

"Pulsed Proton Nuclear Magnetic Resonance Study of Water Mobility in Pentasils ZSM-5 and Silicalite" by Maidwald et al., Set Forth in *Proceedings of the Fifth International Conference on Zeolites*, Edited by Dr. L. V. C. Rees, Jun. 2-6, 1980, pp. 562 to 570.

"Molecular Sieve Brosilicates" by Taramasso et al., Set Forth in *Proceedings of the Fifth International Conference on Zeolites*, Edited by Dr. L. V. C. Rees, Jun. 2-6, 1980, pp. 40 to 48.

"When is a Zeolite Not a Zeolite" by Rees Set Forth in *Nature*, vol. 296, Apr. 8, 1982, pp. 491 to 492.

"Research Articles Triggers Dispute on Zeolite" by Budiansky Set Forth in *Nature* vol. 300, Nov. 25, 1982, p. 309.

"Resolving Crystallographically Distinct Tetrahedral Sites in Silicalite and ZSM-5 by Solic-State NMR" by Fyfe et al., Set Forth in *Nature*, vol. 296, Apr. 8, 1982, p. 530.

Chemical Abstracts No. 95:86887r.
Chemical Abstracts No. 95:206272k.
Chemical Abstracts No. 96:75150q.

PROCESS FOR SIMULTANEOUS HYDROTREATING AND HYDRODEWAXING OF HYDROCARBONS

CROSS-REFERENCE TO RELATED APPLICATIONS

This application is a division of U.S. patent application Ser. No 267,247, filed May 26, 1981 now U.S. Pat. No. 4,428,862, which itself is a continuation-in-part of U.S. patent application Ser. No. 172,868 filed July 28, 1980 abandoned.

BACKGROUND OF THE INVENTION

This invention relates to the catalytic treatment of hydrocarbons in the presence of hydrogen and under conditions of elevated temperature and pressure. More particularly, it relates to treating waxy paraffinic hydrocarbons, particularly full boiling range shale oils, so as to simultaneously lower the pour point thereof by catalytic hydrodewaxing and lower the organosulfur and/or organonitrogen contents thereof by catalytic hydrotreating.

Many hydrocarbon liquid feedstocks have the undesirable properties of high pour point, which causes pumping difficulties under low temperature conditions, and high organonitrogen and/or organosulfur contents, which are undesirable from the standpoint that such components deactivate certain refining catalysts or, if present in the ultimate product when combusted, contribute to atmospheric pollution. One such feedstock is raw shale oil, a feedstock obtained by retorting oil shale, such as the oil shale found in the Colorado River formation in the western United States. When retorted under temperature conditions above about 900° F., a material in the oil shale known as kerogen decomposes, releasing shale oil vapors, which are condensed and collected by known techniques to produce raw liquid shale oil. Such raw shale oil is undesirable because it usually contains solid particulates, arsenic, and organonitrogen and/or organosulfur components. In addition, the raw shale oil has a high pour point, usually in the range of 50° to 90° F., indicative of the presence of a relatively high proportion of wax components, i.e., straight chain and slightly branched paraffins of high molecular weight.

Raw shale oil may be treated by known techniques to reduce the ash and arsenic contents thereof, and it is now known by the teachings in U.S. Pat. No. 4,153,540 issued to Gorring et al. that shale oil can be upgraded by a two-step method in which the shale oil is first contacted with a hydrotreating catalyst under conditions such that the organosulfur and organonitrogen contents of the shale oil are reduced. Subsequently, the hydrotreated shale oil is contacted with a hydrodewaxing catalyst under conditions (750° to 1000° F., 500 to 1500 psig, 0.25 to 1.0 LHSV, and a hydrogen feed rate of 5 to 6 moles per mole of feedstock) such that the feedstock is hydrodewaxed while its 750° F.+fraction is converted by at least 50% to products boiling below 750° F. The hydrodewaxing catalyst employed by Gorring et al. is similar to that of Chen et al. described in U.S. Pat. No. Re. 28,398, that is, it comprises a ZSM-5 zeolite in its hydrogen form combined with a metal having activity for promoting hydrogenation/dehydrogenation reactions.

Although the two-step process described in U.S. Pat. No. 4,153,540 results in a significant reduction in the pour point of the shale oil, it also results in a shale oil product that contains undesirable proportions of organosulfur and organonitrogen components. In particular, the shale oil products reported in the Examples of U.S. Pat. No. 4,153,540 contain excessively high proportions of total nitrogen. One product, for example, contained 1.10 wt.% total nitrogen, representing only about a 50% reduction in organonitrogen components after two hydroprocessing steps. By most refining standards, such a shale oil product would require yet more hydrotreating to reduce the nitrogen content still further, for example, to below about 250 wppm.

In addition, the hydrodewaxing catalyst described in U.S. Pat. No. 4,153,540 exhibits an undesirable amount of hydrocracking. Ideally, one would want to treat the shale oil so as to substantially reduce its organosulfur and organonitrogen contents and its pour point without also (as would be the case in severe hydrocracking) substantially altering the boiling characteristics of the shale oil. But in the process described in U.S. Pat. No. 4,153,540, it appears that the hydrocracking is indiscriminate, that is, the waxy paraffins are hydrocracked sufficiently to lower the pour point but not without also cracking 50% or more of the 750° F.+components as well. Such excessive hydrocracking is especially undesirable if the shale oil is treated for pour point reduction at a distance remote from an oil refinery; it forces one to employ extensive recovery facilities for handling light end materials such as propane and butane and for generating hydrogen in a location where such is usually impractical. Additionally, and perhaps more importantly, to hydrocrack a shale oil so as to convert 50% or more of the 750° F.+fraction while only about 50% of the nitrogen is removed is an inefficient use of hydrogen, particularly when severe hydrocracking is not desired but low nitrogen-containing shale oil products are.

Accordingly, it is one of the objects of the present invention to provide a process for substantially reducing the pour point, sulfur content, and nitrogen content of shale oil feedstocks and other waxy hydrocarbon feedstocks while minimizing the amount of hydrogen consumed. It is another object to provide such a process having the further advantage of selectively hydrocracking the waxy paraffins while not substantially hydrocracking other components. It is yet another object to provide a process wherein a shale oil feedstock containing more than about 0.2 wt.% organosulfur components, and more than about 1.50 wt.% organonitrogen components, and having a pour point above about 50° F. is converted, without substantially disturbing the boiling characteristics of the shale oil, to a shale oil product having a pour point below about 30° F. and containing less than about 400 wppm organonitrogen compounds and less than 25 wppm organosulfur compounds. It is yet another object to provide a catalyst having high activity for selectively hydrocracking a waxy, sulfur-containing and nitrogen-containing hydrocarbon feedstock such that a substantial reduction in the wax content thereof, as evidenced by a substantial reduction in pour point, is obtained simultaneously with a substantial reduction in the organosulfur and organonitrogen compounds contents. These and other advantages will become more apparent in view of the following description of the invention.

SUMMARY OF THE INVENTION

It has now been discovered that a catalyst comprising a Group VIB metal component on a support comprising an intimate admixture of a porous refractory oxide and a silica polymorph consisting essentially of crystalline silica is useful in hydrocarbon dewaxing processes, and particularly for the simultaneous dewaxing and denitrogenation of hydrocarbons.

It has also been discovered in the present invention that waxy hydrocarbon feedstocks having relatively high pour points and containing organosulfur and/or organonitrogen compounds may be simultaneously hydrodewaxed and hydrotreated by contact under conditions of elevated temperature and pressure and the presence of hydrogen with a hydroprocessing catalyst comprising a Group VIB metal component on a support comprising an intimate admixture of a porous refractory oxide and silicalite or other crystalline silica molecular sieve essentially free of aluminum and other Group IIIA metals but having channels with apertures defined by ten membered rings of oxygen atoms. In comparison to the feedstock, the product hydrocarbon is substantially reduced in pour point, organonitrogen components, and organosulfur components.

It has also been discovered that the catalyst of the invention is most especially useful for simultaneously hydrotreating and hydrodewaxing a waxy, full boiling range shale oil that has previously been deashed, dearsenated, and hydrotreated but still contains unacceptable proportions of organosulfur and/or organonitrogen components and has an unacceptably high pour point. One of the advantages of the catalyst of the invention is that, even under relatively severe hydroprocessing conditions as, for example, 2000 psig and 750° F., the waxy components and organosulfur and organonitrogen components are removed without substantially altering the boiling characteristics of the feedstock being treated, particularly with respect to the heavy fractions thereof.

For purposes herein, the crystalline silica molecular sieves used as a component of the catalyst of the invention are considered essentially free of Group IIIA metals when they contain less than about 0.75 weight percent of such metals, calculated as the trioxides thereof, e.g., $Al_2O_3$. All silicalites considered herein are essentially free of Group IIIA metals. Also, all reference herein to proportions of organosulfur or organonitrogen components, calculated as sulfur or nitrogen, respectively, refers to the weight proportion of total sulfur or nitrogen in the liquid hydrocarbon under consideration. Thus, for example, a liquid hydrocarbon weighing 100 grams and containing 40 grams of organonitrogen components, only 1 gram of which is due to nitrogen atoms, contains 1 weight percent of organonitrogen components calculated as nitrogen. There are standard tests known in the petroleum industry for determining the proportions of total nitrogen and total sulfur in a liquid hydrocarbon, such as the Kjeldahl test for nitrogen.

DETAILED DESCRIPTION OF THE INVENTION

The process of the present invention is directed to lowering the pour point of waxy hydrocarbon feedstocks by contact with a catalyst under conditions of elevated temperature and pressure in the presence of hydrogen. Contemplated feedstocks include waxy raffinates or waxy distillates boiling above about 650° F. Such feedstocks, which often have pour points above 70° F., usually above 80° F., and more usually still, above 90° F., may be treated in the process of the invention to produce a lubricating oil of low pour point, i.e., below +30° F. Organonitrogen and organosulfur compounds, which may also be present in the waxy raffinate to be dewaxed, are substantially reduced in the process of the invention, usually from above about 400 wppm to less than 50 wppm in the case of organosulfur components and from above about 125 wppm to less than about 100 wppm, usually less than 75 wppm, in the case of organonitrogen components.

Other typical feedstocks for treatment herein have a pour point above 50° F., an organonitrogen content (calculated as nitrogen) above about 200 wppm, often above 500 wppm, and an organosulfur content (calculated as sulfur) above about 25 wppm. The preferred feedstock is a full range shale oil or a fraction thereof, and the most preferred feedstock is a full range shale oil that has been successively deashed, as by filtration or electrostatic agglomeration, dearsenated, as by the process described in U.S. Pat. No. 4,046,674, herein incorporated by reference in its entirety, and catalytically hydrotreated, as by contact with a hydrotreating catalyst comprising Group VIB and Group VIII metal components on a porous refractory oxide support. When such a sequential deashing-dearsenating-hydrotreating method is applied to shale oils derived by retorting oil shale found in the Colorado River formation and adjacent areas, the full boiling range shale oil will typically have a boiling point range between about 80° F. and about 1030° F., an organonitrogen content between about 200 and 3500 wppm, usually between about 300 and 2000 wppm, an organosulfur content between about 30 and 200 wppm, usually between about 35 and 100 wppm, and a pour point above about 70° F., usually between about 75° and 90° F.

For a typical raw shale oil derived from retorting Colorado oil shale, the sequential treatment specified in the preceding paragraph will generally alter the chemical and pour point characteristics of the oil as shown in Table I, with it being specifically noted that the dearsenating step, wherein a sulfided nickel and molybdenum-containing catalyst, usually containing between about 30 and 70 wt.% nickel components, calculated as NiO, and between 2 and 20 wt.% molybdenum components, calculated as $MoO_3$, on a porous refractory oxide support, such as alumina, is effective for lowering the sulfur and nitrogen contents as well as the arsenic content of the deashed shale oil.

TABLE I

|  | Typical Raw Shale Oil | Deashed Shale Oil | Dearsenated Shale Oil | Hydrotreated Shale Oil |
|---|---|---|---|---|
| Pour Point, °F. | 50–65 | 50–65 | 50–70 | 65–90 |
| Sulfur, wt. % as S | 0.5–1.5 | 0.5–1.5 | 0.2–1.0 | 0.003–0.2 |
| Nitrogen, wt. % as N | 1.6–2.2 | 1.6–2.2 | 1.4–2.0 | 0.020–0.350 |
| Arsenic, wppm as As | 40–70 | 20–30 | <1 | <1 |

In accordance with the invention, the shale oil or other waxy hydrocarbon feedstock is contacted with a particulate catalyst described more fully hereinafter. Usually the contacting will be accomplished in a suitable reactor vessel under conditions of elevated temperature and pressure, with pressures above about 750 psig, usually above 1000 psig being suitable, and between about 1500 and 3000 psig being preferred, and with temperatures above about 650° F. being suitable and temperatures between about 650° and 800° F. being most suitable, primarily because temperatures above about 800° F. usually exceed the metallurgical temperature constraints of commercial, high pressure steel reactors. The rate at which the feedstock is passed through the reactor in contact with the catalyst particles is usually at a liquid hourly space velocity between about 0.1 and 10.0, but preferably between about 0.5 and 2.0. Hydrogen is also required and is usually passed through the reactor at a rate above about 500 standard cubic feet per barrel of feedstock, preferably between about 1500 and 15,000 standard cubic feet per barrel.

Under conditions selected from the foregoing, and with the catalyst to be described hereafter, substantial reductions in pour point, organonitrogen content, and organosulfur content are obtainable. It has been found, as will be demonstrated in Example II hereinafter, that a waxy deashed-dearsenated shale oil feedstock having a pour point of 55° F., an organonitrogen content of 1.8 wt.%, and an organosulfur content of 0.835 wt.% can be converted to a product composition having a pour point of −10° F., an organonitrogen content of 118 wppm, and an organosulfur content of 23 wppm under conditions of 1.0 liquid hourly space velocity, an operating pressure of 2000 psig, a hydrogen feed rate of 10,000 standard cubic feet per barrel, and an operating temperature of about 800° F. In general, in the presence of the catalyst of the invention, reductions in organonitrogen contents over 75% complete and organosulfur contents over 50% complete are obtainable, while substantial reductions in the pour point are simultaneously achieved.

Catalysts useful in the present invention are composed of one or more Group VIB active metal components, particularly the Group VIB metals, oxides, and sulfides, on a support comprising an intimate admixture of a porous refractory oxide and an essentially Group IIIA metal-free crystalline silica molecular sieve having channels with apertures defined by eight or ten member rings of oxygen atoms. The preferred catalyst contains, in addition to Group VIB metal components, one or more Group VIII metal components, particularly the metals, oxides, and sulfides of the iron Group VIII elements, i.e., iron, cobalt, and nickel. Especially contemplated are catalysts containing a nickel and/or cobalt component in combination with a tungsten and/or molybdenum component. The most highly preferred catalyst comprises both nickel and tungsten components especially in the sulfide form. The proportion by weight of the catalyst that comprises the Group VIB metal components is between about 5 and 40%, preferably between about 15 and 30%, calculated as the metal trioxide. The proportion by weight of the catalyst that comprises the Group VIII metal components is between about 0.5 and 15%, preferably between about 1 and 5%, calculated as the metal monoxide.

The porous refractory oxides useful as supports in the hydrotreating-hydrodewaxing catalyst herein include the oxides of difficultly reducible metals, particularly those containing aluminum. Representative of such refractory oxides are alumina, silica, beryllia, chromia, zirconia, titania, magnesia, and thoria. Also representative are silica-alumina, silica-titania, silica-zirconia, silica-zirconia-titania, zirconia-titania, and other such combinations. A specific refractory oxide known to be useful consists essentially of a dispersion of finely divided silica-alumina in a matrix of alumina; this material is more fully described in U.S. Pat. No. 4,097,365, herein incorporated by reference in its entirety. The preferred refractory oxide, however, is alumina, most preferably, gamma alumina, and as with all the refractory oxides contemplated herein, the preferred gamma alumina has a surface area above about 100 m²/gm.

Also included in the support, usually as a dispersion in the porous refractory oxide, is a crystalline silica molecular sieve essentially free of Group IIIA metals, in particular aluminum, gallium, and boron, with the most preferred silica molecular sieve for use herein being a material known as silicalite a silica polymorph that may be prepared by methods described in U.S. Pat. No. 4,061,724, issued to Grose et al., herein incorporated by reference in its entirety. Silicalite may be characterized as a crystalline molecular sieve comprising a channel system (or pore structure) of intersecting elliptical straight channels and nearly circular straight channels, with openings in both types of channels being defined by 10 membered rings of oxygen atoms, such openings being between about 5 and 6 Angstroms in maximum cross-sectional dimension. As reported by Flanigen et al. in "Silicalite, a New Hydrophobic Crystalline Silica Molecular Sieve" in *Nature*, Volume 271, pp. 512 to 516 (Feb. 9, 1978) silicalite is a hydrophobic crystalline silica molecular sieve having the property under ambient conditions of adsorbing benzene (kinetic diameter 5.85 Å) while rejecting molecules larger than 6 Å, such as neopentane (kinetic diameter 6.2 Å). The silicalite disclosed in U.S. Pat. No. 4,061,724 is known to have an X-ray powder diffraction pattern similar to ZSM-5, but recently new silicas having X-ray powder diffraction patterns similar to ZSM-11 have been discovered. (See Bibby et al., "Silicalite-2, a Silica Analog of the Aluminosilicate Zeolite ZSM-11" in *Nature*, Volume 280, pp. 664 to 665 (Aug. 23, 1979).) While ZSM-11 type silicalites are contemplated for use herein, the preferred silicalite is that having an X-ray powder diffraction pattern similar to ZSM-5, which silicalite is known to have a mean refractive index of 1.39±0.01 when calcined in air for one hour at 600° C. This same silicalite is also reported in U.S. Pat. No. 4,061,724 to have a specific gravity at 25° C. of 1.70±0.05 g./cc., although Flanigen et al., in the Feb. 9, 1978, *Nature* article previously specified, report the specific gravity as 1.76 g./cc. It appears, therefore, that this silicalite has a specific gravity between about 1.65 and about 1.80 g./cc., depending perhaps upon the method of preparation.

It should be emphasized that, although silicalite is similar to "ZSM-5 family" members in having a similar X-ray powder diffraction pattern, it is dissimilar in two important aspects. Unlike the "ZSM-5 family," silicalite is not an aluminosilicate, containing only trace proportions of alumina, due to the commercial impossibility of removing contaminant aluminum components from the reagents used to prepare silicalite. Silicalite may contain up to about 0.75 wt.% alumina, calculated as $Al_2O_3$, and is usually prepared to contain more than about 0.15 wt.% alumina. Most silicalites contain less than about 0.6 wt.% alumina, calculated as $Al_2O_3$. Additionally, as disclosed by Grose et al. in U.S. Pat. No. 4,061,724, neither "silicalite nor its silicate precursor exhibits ion exchange properties." Thus, silicalite does not share the zeolitic property of substantial ion exchange common to the crystalline aluminosilicates, and it therefore contains essentially no zeolitic metal cations. It is, however, possible to prepare silicalite with metals present therein as impurities but not as zeolitic cations (as by occlusion). Although operative for purposes herein, such metals-containing silicalites are not preferred. Silicalites containing total metals in only trace proportions, less than about 0.75 percent by weight, calculated as the metals, are preferred.

It should also be noted that silicalite, as taught by Grose et al., may be prepared from a reaction mixture containing organic reagents. Organic components may be present in the silicalite utilized in the invention, but such organic components are removed, usually to a proportion less than about 0.05 weight percent carbon, when the organic-containing silicalite is calcined, as for example, by calcining for one hour in air at 600° C. in accordance with Grose et al.'s teachings. Thus, the catalyst of the invention is preferably prepared with an essentially organic-free, previously calcined silicalite. In an alternative but nonpreferred embodiment, the organic-containing silicalite is not calcined until after it is admixed with the other components utilized to prepare the catalyst, e.g., the Group VIB component and gamma alumina. In other words, the silicalite becomes calcined during the same step of the catalyst preparation procedure designed primarily to convert the metal components to oxides. If this latter embodiment of the invention is chosen, it is preferred that the calcining be such that essentially no organic materials remain in the catalyst. Calcining at 600° C. in air for one hour in accordance with Grose et al.'s teachings is most preferred.

In the preferred embodiment of the invention the support consists essentially of an intimate admixture of silicalite and a porous refractory oxide such as alumina. The proportion of silicalite in the support may vary in the range of 2 to 90% by weight, but preferably the support consists essentially of a heterogeneous dispersion of silicalite in a matrix of alumina or other porous refractory oxide. Such a dispersion contains silicalite in a minor proportion, usually between about 15 and 45%, and more usually between 20 and 40% by weight, with 30% being most highly preferred.

The catalyst of the invention is most preferably prepared in particulate form, with the clover-leaf particulate form shown in FIGS. 8 and 8A of U.S. Pat. No. 4,028,227 being most highly preferred. One convenient method for preparing the catalyst involves first comulling a wetted mixture of calcined silicalite, an alumina gel, and an alumina binder material, such as Catapal ® peptized alumina, in proportions appropriate to what is desired in the final catalyst support. Such a comulled mixture is then extruded through a die having suitable small openings therein in the shape of circles or ellipses, or as is preferred, in the shape of three-leaf clovers. The extruded material is cut into small particulates, dried, and calcined, following which the resulting support particles are impregnated with a liquid solution containing the desired Group VIB element in dissolved form, with other active components, such as nickel, or even an acidic component, such as phosphorus, known for its property to promote hydrotreating reactions, being optionally included. A specifically contemplated impregnation liquid consists essentially of an aqueous solution of dissolved ammonium metatungstate and nickel nitrate, with the dissolved components being present in the impregnation liquid in proportions sufficient to insure that the final catalyst contains more than about 15% by weight tungsten components calculated as $WO_3$ and more than about 0.5% by weight nickel components calculated as NiO. If desired, phosphorus components may also be present in the impregnation liquid so that the final catalyst contains, for example, more than about 0.5% by weight phosphorus components calculated as P. After impregnation, the impregnated composite particles are calcined in air at temperatures at or above about 900° F. for a time period sufficient to convert the metal components to oxide forms.

In an alternative method, the foregoing procedure is altered such that, instead of introducing the Group VIB and/or Group VIII metal components into the support by impregnation, they are incorporated into the catalyst by admixing an appropriate solid or liquid containing the desired metal with the materials to be extruded through the die. Such a method may prove less expensive and more convenient on a commercial scale than the impregnation method.

It is most highly preferred in the invention that the catalyst be converted to the sulfide form, that is, to a form wherein the metal components are converted in substantial part to sulfides. This may be accomplished by contacting the catalyst with a gas stream consisting of hydrogen and 10 volume percent hydrogen sulfide at an elevated temperature. Alternatively, if the waxy feedstock with which it is to be contacted contains organosulfur components, the catalyst may be merely placed into service in the oxide form, and under the conditions hereinbefore specified for simultaneously hydrowaxing and hydrotreating such feedstocks, the catalyst is readily converted to the sulfide form in situ.

The foregoing catalyst has been found to have excellent catalytic properties for promoting hydrotreating reactions and for selectively hydrocracking a waxy hydrocarbon so as to simultaneously lower its sulfur and/or nitrogen content and lower its pour point and viscosity without otherwise substantially altering its chemical and physical properties. Especially noteworthy is the fact that the waxy feedstock may be simultaneously hydrotreated and hydrodewaxed without an undue change in the boiling point characteristics of the hydrocarbon being treated. There must, of course, be some change in boiling characteristics because hydrodewaxing is a form of hydrocracking, and hydrocracking of necessity produces hydrocarbons of lowered boiling points. But the catalyst of the invention is highly selective for hydrocracking waxy paraffins, and such is evidenced in the invention by the sharp drop in pour point and the relatively small amount of conversion of high boiling feed components into lower boiling products. Usually, no more than about 15 to 25% by volume of the high boiling components, and particularly the components boiling above about 670° F., are converted to lower boiling products. Such small percentage conversions of high boiling components are indicative of efficient hydrogen utilization, for the less hydrogen consumed in unnecessarily hydrocracking non-waxy components or unnecessarily converting components other than the organosulfur and/or organonitrogen components, the less costly will be the hydrogeneating facilities required to carry out the process of the invention.

Another advantageous feature of the catalyst of the invention is its stability, that is, its long life for the intended simultaneous hydrodewaxing and hydrotreating reactions required to convert waxy shale oils and the like into more valuable products. Virtually no deactivation of the preferred catalyst of the invention has been detected when utilized under preferred conditions for time periods of more than one month.

The following two Examples are provided to illustrate the process of the invention and to produce evidence of the superior properties of the catalyst of the invention. No Example herein is provided to limit the scope of the invention; the invention is defined by the claims.

lite and gamma alumina in a 30:70 weight ratio, with the silicalite containing about 0.6 wt.% alumina.

TABLE II

FEEDSTOCK AND PRODUCT COMPOSITION AND PROPERTIES

| Product Sample Designation | Feedstock — | A-2 | A-4 | A-11 | A-18 | A-25 | A-39 | A-41 |
|---|---|---|---|---|---|---|---|---|
| Days into Run | — | 2 | 4 | 11 | 18 | 25 | 39 | 41 |
| Gravity °API | 35.0 | 37.3 | 36.0 | 37.3 | 37.2 | 37.5 | 36.7 | 37.6 |
| Pour Point, °F. | +80 | +5 | +15 | +20 | +20 | +10 | −5 | +5 |
| Viscosity at 100° F. cSt | 6.50 | 4.526 | 5.320 | 4.818 | 4.886 | 4.421 | 5.155 | 4.225 |
| Viscosity at 140° F. cSt | 3.84 | 2.863 | 3.273 | 3.020 | 3.046 | 2.857 | 3.185 | 2.709 |
| Nitrogen, wppm | 900 | 179 | 184 | 197 | 197 | 165 | 184 | 179 |
| Sulfur, wppm | 41 | 16 | 15 | 7 | 15 | 10 | 15 | 16 |
| Simulated Distillation Vol. % Boiling Under | | | | | | | | |
| 80° F. | 0 | 1.03 | 0.44 | 0.84 | 1.07 | 1.14 | 0.37 | 0.47 |
| 300° F. | 4.06 | 10.25 | 7.69 | 9.03 | 9.08 | 11.16 | 9.04 | 10.32 |
| 520° F. | 32.91 | 41.94 | 37.82 | 40.67 | 39.31 | 43.01 | 38.87 | 44.35 |
| 670° F. | 56.09 | 65.74 | 62.82 | 64.34 | 63.18 | 65.71 | 62.53 | 67.01 |
| 750° F. | 68.05 | 76.57 | 74.17 | 75.13 | 74.39 | 76.21 | 73.92 | 77.08 |

EXAMPLE I

A raw shale oil was deashed and catalytically dearsenated (as by a method shown in U.S. Pat. No. 4,046,674), and the resulting treated shale oil, containing more than about 1.5 wt.% organonitrogen components and more than about 0.5 wt.% organosulfur components, was catalytically hydrotreated, the resulting feedstock having the properties shown in Table II. The feedstock was passed through a reactor containing 130 ml (about 120 gm) of catalyst particles hereinafter described at a liquid hourly space velocity of 1.0 v/v/hr, a pressure of 2000 psig, and a temperature of about 737° F. To simulate the gas phase that would be present if the feedstock were present with the gases normally recovered therewith from the catalytic hydrotreater, hydrogen was fed into the reactor at a rate of about 8000 standard cubic feet per barrel of feedstock fed into the reactor, thiophene was fed at a rate sufficient to simulate the amount of $H_2S$ produced from hydrotreating a feedstock containing 0.84 wt.% sulfur, and tertiary butylamine was fed at a rate sufficient to simulate the amount of ammonia that would be produced from hydrotreating a feedstock containing 1.8 wt.% organonitrogen components.

The catalyst utilized in the reactor was prepared as follows: A mixture of 30 wt.% silicalite, 50 wt.% gamma alumina powder, and 20 wt.% peptized Catapal ® alumina was wetted with sufficient water to produce an extrudable paste that was extruded through a die containing cloverleaf-shaped openings therein having a maximum dimension of about 1/16 inch. The extruded product was cut into particles of about ⅛ to ½ inch lengths, dried, and calcined. The calcined particles (i.e., the extrudates) were thus of a shape similar to that shown in FIGS. 8 and 8A of U.S. Pat. No. 4,028,227 issued to Gustafson. The extrudates (200 gm) were then impregnated with nickel and tungsten components by contact with 220 ml of an aqueous solution prepared by dissolving 67 gm nickel nitrate ($Ni(NO_3)_2 \cdot 6H_2O$) and 108 gm ammonium metatungstate (91% $WO_3$ by weight) into 330 ml of water. The resulting impregnated composite was dried and then calcined at 900° F. The final catalyst consisted of about 2.94 wt.% nickel components, calculated as NiO, about 21.5 wt.% tungsten components, calculated as $WO_3$, and the balance silica- Results of the foregoing experiment are shown in Table II wherein data relative to the composition and properties of the product shale oil at various times during the run are tabulated. As shown, the catalyst of the invention is highly active for reducing the organosulfur content, the organonitrogen content, and the pour point of the feedstock. Additionally, the catalyst of the invention proves highly active for selective hydrocracking of waxy components, with less than about 30%, usually less than about 25%, of the 750° F.+ fraction being converted to components boiling below 750° F. and less than about 20% of the 670° F.+ fraction being converted to products boiling below 670° F., even when the resultant pour point is in the 0° to +30° F. range. Of course, it can be expected that if pour points lower than those shown in Table II are desired, then more severe conditions would be required, which severe conditions would result in increased cracking of the heavy fraction. But for purposes of producing a "pipelineable" shale oil (i.e., a shale oil having a pour point of +30° F. or less), the data in Table II clearly indicate that pour points as low as −5° F. are obtainable with far less than half the heavy fraction being converted to lower boiling components.

Also evident from the data in Table II is that the catalyst of the invention is not only highly active under the conditions utilized in the experiment but also highly stable, evincing (after the catalyst achieved equilibrium on about the third day) no deactivation for the intended hydrodewaxing and hydrotreating reactions through the forty-first day. (It should also be noted that the catalyst had, prior to the experiment, been utilized for fifty-seven days under dewaxing conditions similar to those described above, the only significant difference being that ethylenediamine was fed to simulate the presence of ammonia. Despite such previous use, the catalyst of the invention remained highly active under the conditions of the experiment for the time period reported in Table II, as well as for the next eighty-eight days. All totaled, the catalyst proved active for 186 days of operation and at the end of the experiment showed virtually no signs of deactivation.)

When the product compositions obtained from the experiment described in Example I were further evaluated, it was unexpectedly found that three fractions thereof, the diesel fraction having a true boiling point range (as opposed to an ASTM distillation range) of 300° to 670° F., the Jet A turbine fuel fraction of 300° to 520° F., and the JP-4 turbine fuel fraction consisting of components boiling at or below 470° F., all met appropriate freeze point and/or pour point requirements whereas the hydrotreated feedstock did not. The diesel fraction obtained in the process of the invention had a pour point no greater than +5° F., the Jet A fraction had a freeze point no greater than −40° F., and the JP-4 fraction had a freeze point no greater than −72° F. In view of these findings, it is a specific embodiment of the invention to subject an essentially full boiling range shale oil of high pour point, and particularly a shale oil derived from an oil shale of the Colorado River formation, to catalytic hydrotreating followed by catalytic hydrodewaxing, the latter using a catalyst of the invention, under conditions such that a product is obtained containing one or more of a diesel fraction, a Jet A fraction, and a JP-4 fraction meeting and pour point and/or freeze point specifications set forth above. These fractions may then be recovered by conventional distillation methods.

EXAMPLE II

Three catalysts were tested to compare their activities for simultaneously hydrodewaxing and hydrotreating a deashed-dearsenated shale oil feedstock having the properties and characteristics as shown in the following Table III:

TABLE III

Properties and Characteristics of Feedstock

|  |  | Distillation, D-1160, °F. | |
|---|---|---|---|
| Gravity, °API @ 60° F. | 21.3 | | |
| Pour Point, °F. | 55 | IBP/5 | 210/377 |
| Viscosity @ 100° F., SUS | 154.2 | 10/20 | 446/535 |
| Viscosity @ 140° F., SUS | 71.4 | 30/40 | 614/692 |
| Sulfur, wt. % | 0.835 | 50/60 | 760/817 |
| Nitrogen, Total, wt. % | 1.80 | 70/80 | 869/929 |
| Hydrogen, wt. % | 11.61 | 90/95 | 1000/1047 |
| Total Olefins, wt. % | 18.8 | Max/Rec. | 1081/97.6 |
| Aniline Point, °C. | 40.3 | | |
| Arsenic, wppm | 0.7 | | |
| Oxygen, wppm | 119 | | |

(The foregoing feedstock is the one from which the feedstock of Example I was derived by hydrotreating in the presence of Catalyst B hereinafter described.)

The three catalysts utilized to treat the feedstock of Table III are described as follows:

Catalyst A

This catalyst was prepared in a manner similar to that of Example I and was of essentially the same composition and particulate shape.

Catalyst B

This catalyst was a commercially available hydrotreating catalyst containing about 18 wt.% molybdenum components, calculated as $MoO_3$, 2.9 wt.% nickel components, calculated as NiO, and 3.2 wt.% phosphorus components, calculated as P, the balance being gamma alumina. The catalyst was in the form of particles having a three-leaf clover cross-sectional shape.

Catalyst C

This catalyst, being in the form of particles having three-leaf clover cross-sectional shapes similar to Catalysts A and B, consisted essentially of 3.90 weight percent of nickel components, calculated as NiO, and 23.2 weight percent tungsten components, calculated as $WO_3$, on a support of silica uniformly dispersed in a matrix of alumina. The support was composed of 25% by weight silica and 75% by weight alumina and had a surface area of 224 $m^2$/gm.

The foregoing catalysts were each utilized under the following conditions: 2000 psig, $H_2$ feed rate of 10,000 scf/bbl of feed, and 1.0 LHSV. Temperatures were varied between about 749° and 820° F., and the results of so varying the temperature for each of Catalysts A, B, and C with respect to the pour point, sulfur content, and nitrogen content of the product is shown in the following Table IV:

TABLE IV

| | Product Sulfur, Nitrogen, and Pour Point | | | | | | | | |
|---|---|---|---|---|---|---|---|---|---|
| Operating Tempera- | Pour Point °F. | | | Nitrogen, wppm | | | Sulfur, wppm | | |
| ture, °F. | A | B | C | A | B | C | A | B | C |
| 749 | — | — | 80 | — | — | 1230 | — | — | 107 |
| 760 | 65 | 75 | — | — | 165 | — | 773 | 46 | — |
| 780 | 70 | 75 | 80 | 465 | 55 | 84 | 50 | 46 | 30 |
| 800 | −10 | 75 | — | 118 | 9 | — | 23 | 23 | — |
| 810 | — | — | 55 | — | — | 5 | — | — | 18 |
| 820 | −50 | 70 | — | — | 4 | — | 22 | 22 | — |

The foregoing data clearly show the high activity of the catalyst of the invention for simultaneously reducing the pour point, sulfur content, and nitrogen content of the shale oil feedstock at temperatures above 780° F. Catalysts B and C exhibit little hydrodewaxing activity, although both showed high denitrogenation and desulfurization activity. The lack of hydrodewaxing activity in Catalysts B and C is attributable, at least in part, to the absence of a cracking component. The comparison of this Example is provided mainly to illustrate that the catalyst of the invention has hydrotreating activity approaching that of typical hydrotreating catalysts.

Although the data in Example II demonstrate the effectiveness of the catalyst of the invention for treating a full boiling range shale oil feedstock containing large proportions of organonitrogen and organosulfur components, it is preferred in the invention that the shale oil feedstock, be catalytically hydrotreated, as for example, by contact with a conventional catalyst comprising Group VIB and Group VIII metal components under conditions of elevated temperature and pressure and in the presence of added hydrogen, prior to being contacted with the catalyst of the invention. Any suitable, conventional hydrotreating catalyst may be utilized for this purpose, especially those composed of nickel, molybdenum, and phosphorus components supported on alumina. In general, hydrotreating catalysts suitable for pretreating the shale oil feedstock comprise Group VIB metal components, particularly those of molybdenum and tungsten, and Group VIII metal components, particularly those of nickel and cobalt, on a porous refractory oxide, such as those listed hereinbefore with respect to the catalyst of the invention, with alumina being preferred. The catalyst utilized for hydrotreating in this manner may comprise Group VIB and Group VIII metal components (particularly the sulfides) in proportions as set forth hereinbefore with respect to the catalyst of the invention.

It is, as stated before, a highly preferred embodiment of the invention to treat a deashed-dearsenated, full boiling range shale oil feedstock by the method of the invention wherein the shale oil is first catalytically hydrotreated and then subjected to simultaneous hydrotreating and hydrodewaxing in the presence of the catalyst of the invention. One of the peculiarities of many waxy shale oil feedstocks is that hydrotreating substantially raises the pour point thereof. For example, in the data presented in Example II, it will be noticed that the shale oil feedstock had a pour point of +55° F. but that, for each of the catalysts described in Example II, the pour point was raised when the conditions were such that the catalyst could only promote hydrotreating reactions. This curious result is believed due to the fact that hydrotreating saturates olefins, thereby producing paraffins, which, for shale oils produced from oil shales of the Colorado River formation, tend to be highly waxy. In any event, it is a specific embodiment of the invention to treat waxy shale oil feedstocks containing organonitrogen compounds and/or organosulfur compounds by first catalytically hydrotreating the feedstock so that a substantial proportion of the organonitrogen and/or organosulfur compounds are removed but the pour point is substantially increased and then contacting the hydrotreated product with the hydrodewaxing catalyst under appropriate conditions such that yet further removal of organonitrogen compounds and/or organosulfur compounds is accomplished and, concomitant therewith, the pour point of the hydrotreated shale oil is reduced to a value substantially below that of the original feedstock. In accordance with this embodiment of the invention, a deashed-dearsenated, full boiling range shale oil feedstock having a pour point above about 50° F. and containing more than about 0.20 wt.% organosulfur components and more than about 1.50 wt.% organonitrogen components, calculated as sulfur and nitrogen, respectively, are catalytically hydrotreated in the presence of a typical, sulfided hydrotreating catalyst containing a Group VIB metal (e.g., Mo, W) and a Group VIII metal (e.g., Ni, Co) on a porous refractory oxide, preferably alumina, under conditions such that the pour point rises above about 70° F. while the organonitrogen content drops to between about 200 to 3500 wppm, usually between 300 and 2000 wppm, and often between 300 and 1000 wppm, and the organosulfur content drops to between about 30 to 2000 wppm. The entire effluent obtained in the hydrotreating stage, including the unreacted hydrogen and the produced ammonia and hydrogen sulfide, is then passed to a reactor containing the catalyst of the invention in particulate form. Preferably, the outlet temperature of the effluent of the hydrotreating stage is the same as, or within about 25° F. of, the inlet temperature of the feed to the second stage containing the hydrotreating-dewaxing catalyst. Conditions in the second stage are such as to produce a product shale oil having a pour point below about 30° F., preferably below 25° F., an organosulfur content below about 25 wppm, preferably below 20 wppm, and an organonitrogen content below about 400 wppm, preferably below 100 wppm. Conditions from which such results may be produced from typical deashed-dearsenated shale oil feeds with the hydrotreating and hydrodewaxing-hydrotreating catalysts described in Example I hereinbefore are as follows:

TABLE V

| Condition | Hydro-treating | Simultaneous Hydro-treating-Hydrodewaxing |
|---|---|---|
| Space Velocity, LHSV | | |
| Suitable | 0.1–2.0 | 0.1–10 |
| Preferred | 0.3–0.7 | 0.5–2.0 |
| Temperature, °F. | | |
| Suitable | >650 | >650 |
| Preferred | 700–775 | 700–780 |
| Highly Preferred | 725–745 | 720–750 |

TABLE V-continued

| Condition | Hydro-treating | Simultaneous Hydro-treating-Hydrodewaxing |
|---|---|---|
| Pressure, psig | | |
| Suitable | >750 | >750 |
| Preferred | 1500–2500 | 1500–3000 |
| Highly Preferred | 2000–2500 | 2000–2500 |
| H$_2$ Added Plus H$_2$ in Recycle Gas, scf/bbl | | |
| Suitable | >500 | >500 |
| Preferred | >2000 | 1500–15,000 |
| Highly Preferred | 4000–7000 | 6000–10,000 |

The following Example illustrates a method for treating deashed-dearsenated shale oil by hydrotreating followed by simultaneous hydrotreating-hydrodewaxing.

EXAMPLE III

In an experiment designed to determine the effectiveness of subjecting a deashed-dearsenated shale oil feedstock to catalytic hydrotreating followed by simultaneous hydrotreating-hydrodewaxing with the catalyst of the invention, an experiment was conducted over about a nine-month period. In the experiment, deashed-dearsenated, waxy shale oil feedstocks typically having the properties and characteristics shown in the following Table VI:

TABLE VI

| | | Modified Vacuum Engler Distillation, Volume Percent Cut Versus Temperature, °F. | |
|---|---|---|---|
| Gravity, °API | 25.1 | | |
| Hydrogen, wt. % | 11.95 | | |
| Nitrogen, kjel, wt. % | 1.75 | IBP/5 | 233/346 |
| Sulfur, X-ray, wt. % | 0.409 | 10/20 | 400/532 |
| Oxygen, wt. % | 0.842 | 30/40 | 615/693 |
| Analine Point, °F. | 121 | 50/60 | 758/814 |
| Pour Point, °F. | +76 | 70/80 | 871/922 |
| Viscosity @ 210° F., SSU | 38.2 | 90/95 | 981/1025 |
| Carbon Residue, D189, wt. % | 0.5 | EP at 98.7% | 1072 | were first subjected to catalytic hydrotreating in an appropriate reactor vessel containing a catalyst of composition and properties similar to that of Catalyst B in Example II, following which the entire effluent recovered from hydrotreating was passed downwardly through a second reactor vessel containing the hydrotreating-hydrodewaxing catalyst of the invention. This catalyst was in the form of 1/16 inch diameter cylindrical extrudates of about ¼ to ¾ inch particle length. The catalyst was composed of 2.9 wt.% nickel components, calculated as NiO, and 21.5 wt.% tungsten components, calculated as WO$_3$, on a support consisting essentially of 70 wt.% alumina and 30 wt.% silicalite containing 0.74 wt.% alumina. The operating conditions were as shown in the following Table VIII:

TABLE VII

| | Hydro-treating | Hydrotreating Dewaxing |
|---|---|---|
| Pressure, psig | 2225 | 2225 |
| Space Velocity, LHSV | 0.59 | 1.0 |
| Reactor Temperatures, °F. | 715–735 | 740–780 |
| Catalyst Charge, gm | 431 | 300* |
| Gas Rate, scf/bbl | 5500 | 8000 |

TABLE VII-continued

| | Hydro-treating | Hydrotreating Dewaxing |
|---|---|---|
| H$_2$ Concentration in Gas, mole % | 91 | 91 |

*Note:
During a portion of the run, the catalyst charge also contained, at the bottom of the bed, 30 grams of Catalyst B.

Temperatures were varied in the hydrotreating and hydrotreating-hydrodewaxing reactors during the experiment. It was found that varying the temperatures within the ranges shown in Table VII for hydrotreating resulted in a dramatic decrease in the organonitrogen content in the effluent therefrom, usually from the 1.75 wt.% value for the feedstock to less than 1000 wppm, and with temperatures above 730° F., to 500 wppm or less. Temperature was also varied in the hydrotreating-hydrodewaxing reactor, largely for the purpose of lowering the pour point of the incoming liquid phase but also for the purpose of further lowering the organonitrogen and organosulfur contents of the effluent from the hydrotreating reactor. The organonitrogen content of the product recovered from the hydrotreating-hydrodewaxing reactor was consistently below 200 wppm, and consistently below 100 wppm when temperatures above 730° F. were utilized in the first-stage hydrotreating reactor. Also, the organosulfur content was consistently maintained below 25 wppm, often below 20 wppm, while the pour point decreased considerably with increases in the operating temperature of the hydrotreating-hydrodewaxing reactor. Some data derived from operating at three different temperatures in the hydrotreating-hydrodewaxing reactor are presented in the following Table VIII wherein "TBP" refers to the true boiling point range of the fraction specified:

TABLE VIII

| Average Bed Reactor Temperature, °F. | 745 | 760 | 780 |
|---|---|---|---|
| Pour Point, °F. | +25 | 0 | −25 |
| Maximum JP-4*: | | | |
| TBP Cuts, °F. | C$_5$-480 | C$_5$-480 | C$_5$-510 |
| Yield, vol. % | 34 | 42 | 52 |
| Heavy Diesel: | | | |
| TBP Cuts, °F. | 480–620 | 480–640 | 510–620 |
| Yield, vol. % | 25 | 29 | 20 |
| Fuel Oil: | | | |
| TBP Cuts, °F. | 620+ | 640+ | 620+ |
| Yield, vol. % | 49 | 33 | 28 |
| Light Naphtha: | | | |
| TBP Cuts, °F. | C$_5$-280 | C$_5$-270 | C$_5$-270 |
| Yield, vol. % | 8 | 8 | 10 Maximum |
| Diesel: | | | |
| TBP Cuts, °F. | 280–680 | 270–720 | 270–760 |
| Yield, vol. % | 61 | 73 | 78 |
| Oil: | | | |
| TBP Cuts, °F. | 680+ | 720+ | 780+ |
| Yield, vol. % | 35 | 23 | 12 |

*Note:
JP-4 fractions obtained when the hydrotreating-hydrodewaxing reactor contained 30 gm. of Catalyst B consistently met the JFTOT stability test, ASTM D-3241-77 entitled "Test for Thermal Oxidation Stability of Aviation Turbine Fuels."

In the foregoing example, the entire effluent from the hydrotreater was passed to the reactor containing the hydrotreating-hydrodewaxing catalyst of the invention. This is the preferred embodiment of the invention. However, in other embodiments of the invention wherein waxy organonitrogen-containing feedstocks are treated by the above-described two-step procedure, it may be desirable to remove ammonia from the effluent of the hydrotreating stage so that the feed to the simultaneous hydrodewaxing-hydrotreating stage contains essentially no ammonia. This may be accomplished by any convenient means, such as absorption in a caustic solution. This procedure has the advantage of removing a known hydrocracking deactivating component, i.e., ammonia, from the material in contact with the catalyst of the second stage. In this embodiment of the invention, one obtains much reduced pour points under otherwise similar operating conditions. But such a method in many instances is either unnecessary, the pour point being reduced sufficiently even in the presence of ammonia, or too costly, requiring additional capital expense for a scrubber or the like.

The following Example provides a comparison between catalysts of the invention and a catalyst of similar composition but containing ZSM-5 in place of silicalite.

EXAMPLE IV

A deashed-dearsenated-hydrotreated shale oil, designated F-3420, had the properties and characteristics shown in the following Table IX:

TABLE IX

| | | ASTM Distillation, D-1160 | |
|---|---|---|---|
| Gravity, °API | | | |
| Pour Point | +80 | Initial BP | 223° F. |
| Kinematic Viscosity | 10% | 394° F. | |
| at 100° F., cSt | 6.50 | 50% | 660° F. |
| at 100° F., SUS | 47.2 | 90% | 914° F. |
| Nitrogen, wppm | 900 | EP | 1027° F. |
| Sulfur, wppm | 41 | | |

This feedstock was obtained by electrostatically deashing a raw, full range shale oil derived from retorting Colorado oil shale, dearsenating the resulting deashed shale oil by a method described in U.S. Pat. No. 4,046,674 such that the resultant product was not only virtually free of arsenic but contained 1.8 wt.% nitrogen and 0.835 wt.% sulfur and had a pour point of 55° F. This deashed-dearsenated product was then hydrotreated under conditions of elevated temperature and pressure in the presence of added hydrogen and a sulfided catalyst comprising about 18 wt.% molybdenum components, calculated as MoO$_3$, about 3 wt.% nickel components, calculated as NiO, and about 3 wt.% phosphorus components, calculated as P, on a gamma alumina support having a three-leaf clover cross-sectional shape.

To simulate the entire effluent recovered from hydrotreating, tertiary butylamine and thiophene were added to the F-3420 feedstock. The tertiary butylamine and thiophene were added at rates sufficient to simulate the amount of ammonia and H$_2$S, respectively, that would be produced by hydrotreating a feedstock containing 1.8 wt.% organonitrogen components, calculated as nitrogen, and 0.84 wt.% organosulfur components, calculated as sulfur.

The foregoing feedstock containing added thiophene and tertiary butylamine was passed in separate runs through a reactor containing five different samples of catalyst particles under the following conditions: 2000 psig, 1.0 LHSV, 8000 scf/bbl once through H$_2$-to-oil ratio, 266 lbs/hr-ft$^2$ mass velocity, and temperature varied to provide a product having a +30° F. pour point. One catalyst used in the experiment, Catalyst A, consisted essentially of 2.6 wt.% NiO and 20.3 wt.% WO$_3$ on clover-leaf-shaped supports consisting essentially of 30 wt.% ZSM-5 in the hydrogen form and the balance being alumina, with the ZSM-5 containing about 3 wt.% alumina. A second catalyst, Catalyst B, consisted essentially of 3.6 wt.% NiO and 22.5 wt.% WO$_3$ on 1/16 inch diameter cylindrical supports consisting essentially of 30 wt.% silicalite and the balance alumina, the silicalite containing about 0.74 wt.% alumina. The third catalyst, Catalyst C, was similar to Catalyst B but contained 2.9 wt.% NiO and 21.5 wt.% WO$_3$ and had clover-leaf-shaped supports comprising 30 wt.% silicalite containing 0.6 wt.% alumina. The fourth catalyst, Catalyst D, was similar to Catalyst B but comprised 3.3 wt.% NiO and 22.3 wt.% WO$_3$ on cylindrical supports comprising 30 wt.% silicalite containing about 0.44 wt.% alumina. And the fifth catalyst, Catalyst E, was also similar to Catalyst B but contained 5 wt.% NiO and 22 wt.% WO$_3$ on a clover-leaf-shaped support comprising 30 wt.% silicalite containing 44 wppm (0.0044 wt.%) alumina. The reactor temperatures required to produce a +30° F. pour point product are tabulated in the following Table X:

TABLE X

| Catalyst | Dewaxing Component | Average Bed Reactor Temperature to Yield +30° F. Pour Point Product |
|---|---|---|
| A | ZSM-5; 3.0 wt. % Al$_2$O$_3$ | 747° F. |
| B | Silicalite; 0.74 wt. % Al$_2$O$_3$ | 739° F. |
| C | Silicalite; 0.6 wt. % Al$_2$O$_3$ | 743° F. |
| D | Silicalite; 0.44 wt. % Al$_2$O$_3$ | 745° F. |
| E | Silicalite; 0.0044 wt. % Al$_2$O$_3$ | 797° F. |

As shown by the foregoing, the dewaxing activity of silicalite-containing catalysts wherein the silicalite contains alumina in a proportion between about 0.15 and 0.75 wt.% is greater than ZSM-5 for reducing the pour point of shale oil feedstocks. This result is considered very surprising. It has been reported that the activity of the ZSM-5 type zeolites varies directly with the proportion of alumina. For example, in "Chemical and Physical Properties of the ZSM-5 Substitutional Series" by D. H. Olson et al. published in the *Journal of Catalysis*, Vol. 61, pp 390–396 (1980), it is taught that hexane cracking activity of ZSM-5 drops off linearly as the alumina content decreases and falls to zero when the alumina content becomes zero. The reason offered by Olson et al. for this linear dependence of cracking activity upon alumina content is that activity is dependent upon the number of acid sites in ZSM-5, which in turn is dependent upon the alumina content. Based in part upon this hexane cracking data, Olson et al. conclude that silicalite "appears to be a member of the ZSM-5 substitutional series." But as shown by the data in the above Table X, silicalite has properties not predictable from those of ZSM-5. More specifically, Catalysts B, C, and D all contained silicalites of far lower alumina concentration than ZSM-5 but demonstrated greater activity for the cracking reactions involved in hydrodewaxing shale oils. Even the activity of Catalyst E, which contained silicalite having only 44 wppm alumina, was surprising. According to the linear relationship proposed by Olson et al., this silicalite should have virtually no cracking activity, yet it demonstrated sufficient activity to yield a +30° F. pour point product at an operating temperature below 800° F.

In the following example, it is shown how the catalyst of the invention may be utilized to produce lubricating oils from waxy raffinates.

EXAMPLE V

A silicalite-containing catalyst of similar composition to that described in Example III was used to selectively hydrocrack a waxy raffinate to produce a low pour point lube stock. The raffinate had the properties and characteristics shown in the following Table XI:

TABLE XI

|  |  | ASTM Distillation, D-1160, °F. |  |
|---|---|---|---|
| Gravity, °API | 102 | IBP | 660 |
| Pour Point, °F. | 18.0 | 5% | 726 |
| Wax, wt. % | 0.053 | 10% | 748 |
| Sulfur, wt. % | 0.014 | 30% | 793 |
| Nitrogen, wt. % |  | 50% | 841 |
| Kinematic Viscosity |  |  |  |
| at 140° F., cSt | 25.47 | 70% | 929 |
| at 210° F., sCt | 8.395 | 90% | 1065 |

Test conditions were as follows: 600 psig, 2500 scf/bbl of once-through hydrogen, and 1.0 liquid hourly space velocity. Operation at 729° F. yielded a product hydrocarbon containing 58.5% by volume of a 700° F.+ fraction having a +20° F. pour point, a kinematic viscosity at 100° F. of 85.91 cSt, a kinematic viscosity at 210° F. of 9.92 cSt, and a viscosity index of 93.6. Also, the product hydrocarbon contained only 60 wppm of organonitrogen components and 10 wppm of organosulfur components.

In the foregoing experiment, it was unexpectedly discovered that, when ammonia was blended into the waxy raffinate being treated for dewaxing (in the form of tertiary butylamine), the gravity of the product remained essentially equal to that of the feed while the pour point was lowered to about +20° F. These results suggest that ammonia retards or prevents the degradation of the high boiling components in waxy raffinates to lower boiling constituents during the dewaxing treatment and that ammonia tends to increase the selectivity of the catalyst of the invention for cracking normal paraffins. It is also believed that the addition of ammonia will aid in increasing the viscosity index of the product lubricating oil.

Although the invention has been described in conjunction with examples thereof, including comparative examples, many modifications, variations, and alternatives of the invention as described will be apparent to those skilled in the art. For example, in many processes for treating hydrocarbon liquids, the liquid is hydrotreated catalytically to remove sulfur and/or nitrogen components, following which the entire effluent, or a portion thereof, is hydrocracked catalytically using a catalyst containing Group VIB and VIII metals on a support containing a zeolite. Often, because hydrocrackate product is recycled to the stream entering the hydrocracker, the waxy paraffin content of the hydrocarbon stream entering the hydrocracker becomes excessive, and it can be seen that the catalyst of the invention may be placed in the hydrocracker, as for example, as a layer of catalyst above the hydrocracking catalyst, so that the hydrocarbon stream passing downwardly through the hydrodewaxing catalyst of the invention and then through the hydrocracking catalyst is firstly dewaxed to lower the waxy paraffin content and then hydrocracked to yield desired products. This embodiment of the invention is especially contemplated for producing high end point jet fuels.

Accordingly, it is intended to embrace within the claimed subject matter all variations, modifications, and alternatives to the invention as fall within the spirit and scope of the appended claims.

We claim:

1. In a process for catalytically dewaxing a hydrocarbon feedstock containing waxy paraffins by contact with a solid catalyst under conditions of elevated temperature and pressure, the improvement wherein said catalyst comprises a Group VIB metal component on a support comprising a porous refractory oxide in intimate admixture with an essentially Group IIIA metal-free crystalline silica molecular sieve having channels with apertures defined by ten membered rings of oxygen atoms.

2. A process as defined in claim 1 wherein said silica molecular sieve is a silicalite having a mean refractive index of 1.39±0.01 and a specific gravity between about 1.65 and 1.80 at 25° C.

3. A process for simultaneously hydrodewaxing and hydrotreating a waxy hydrocarbon feedstock having an undesirably high pour point and containing one or more contaminants selected from the group consisting of organosulfur compounds and organonitrogen compounds, which process comprises contacting the feedstock with a catalyst comprising a Group VIB metal component on a support comprising an intimate admixture of a porous refractory oxide and an essentially Group IIIA metal-free crystalline silica molecular sieve having channels with apertures defined by ten membered rings of oxygen atoms under conditions, including an elevated temperature and pressure and the presence of hydrogen, such that a hydrocarbon product containing substantially less of said contaminants and having a pour point substantially reduced in comparison to said feedstock is produced.

4. A process for hydrodewaxing a waxy hydrocarbon feedstock having an undesirably high pour point, which process comprises contacting said feedstock with a catalyst comprising a Group VIB metal component on a support comprising an intimate admixture of a porous refractory oxide and an essentially Group IIIA metal-free crystalline silica molecular sieve having channels with apertures defined by ten membered rings of oxygen atoms under conditions, including an elevated temperature and pressure and the presence of hydrogen, such that less than about 25%, by volume, of the components boiling above 750° F. are converted to products boiling below 750° F. and a product hydrocarbon is produced having a pour point substantially lower than said feedstock.

5. A process as defined in claim 3 or 4 wherein said catalyst also comprises Group VIII metal components.

6. A process as defined in claim 5 wherein said Group VIB metal components are selected from the group consisting of tungsten and molybdenum, the oxides thereof, and the sulfides thereof, and said Group VIII metal components are selected from the group consisting of nickel and cobalt, the oxides thereof, and the sulfides thereof.

7. A process as defined in claim 6 wherein said feedstock contains organonitrogen components and said product hydrocarbon contains said organonitrogen components in a substantially reduced proportion.

8. A process as defined in claim 7 wherein said feedstock has a pour point above about 50° F. and said product hydrocarbon has a pour point below about 30° F.

9. A process as defined in claim 8 wherein said conditions include a temperature less than about 800° F.

10. A process as defined in claim 9 wherein said crystalline molecular sieve is a silicalite.

11. A process as defined in claim 9 wherein said feedstock is derived from shale oil.

12. A process as defined in claim 9 wherein said porous refractory oxide is gamma alumina.

13. A process as defined in claim 12 wherein said feedstock is derived from shale oil.

14. A process as defined in claim 4 wherein said feedstock is derived from a shale oil.

15. A process for treating a hydrocarbon feedstock containing a substantial proportion of organonitrogen components and having a pour point above about 50° F., said process comprising (1) contacting said feedstock with a catalyst comprising one or more Group VIB metal components and one or more Group VIII metal components on a support comprising a dispersion of an organic-free silicalite containing no more than about 0.75 weight percent total metals, calculated as metals, in a porous refractory oxide selected from the group consisting of silica, alumina, thoria, beryllia, zirconia, magnesia, chromia, silica-alumina, silica-titania, silica-zirconia, silica-zirconia-titania, zirconia-titania, and combinations thereof, under conditions, including an elevated temperature between about 650° and about 800° F. and an elevated pressure and the presence of hydrogen, such that a product hydrocarbon of substantially lowered organonitrogen components content and of substantially lowered pour point is produced, and (2) recovering said product hydrocarbon.

16. A process as defined in claim 15 wherein said product hydrocarbon has a pour point below about 30° F. and contains organonitrogen components in a proportion less than about 25% of that of the feedstock.

17. A process as defined in claim 15 wherein said catalyst comprises between about 5 and 40 weight percent of Group VIB metal components selected from the group consisting of tungsten and molybdenum sulfides, calculated as oxides, and between about 0.5 and 15 weight percent of Group VIII metal components selected from the group consisting of nickel and cobalt sulfides, calculated as oxides.

18. A process as defined in claim 15 wherein said feedstock has a pour point above about 70° F. and said product hydrocarbon has a pour point below about 30° F.

19. A process as defined in claim 15 wherein said feedstock contains organosulfur components and the contacting in step (1) is such that said product hydrocarbon contains organosulfur components in a concentration less than about 50% of that of the feedstock.

20. A process as defined in claim 17 wherein said feedstock contains a substantial proportion of components boiling above about 750° F. but no more than about 30%, by volume, of said components are converted in step (1) to products boiling below 750° F.

21. A process as defined in claim 20 wherein said feedstock is derived from a shale oil.

22. A process as defined in claim 17 wherein said catalyst also contains more than about 0.5 weight percent phosphorus components calculated as P.

23. A process for simultaneously hydrotreating and hydrodewaxing a hydrocarbon feedstock derived from shale oil, said feedstock containing organonitrogen compounds in a concentration above about 200 wppm, calculated as nitrogen, organosulfur compounds in a concentration above about 25 wppm, calculated as sulfur, and a pour point above about 50° F., which process comprises: (1) contacting said feedstock with a hydroprocessing catalyst comprising one or more Group VIB metal components selected from the group consisting of molybdenum, tungsten, the oxides thereof, and the sulfides thereof, one or more Group VIII metal components selected from the group consisting of nickel, cobalt, iron, the oxides thereof, and the sulfides thereof, on a support consisting essentially of a porous refractory oxide and an organic-free crystalline silica molecular sieve containing less than about 0.75 weight percent Group IIIA metals, calculated as trioxides, and having intersecting channels having openings between about 5 and 6 Angstroms as defined by 10 membered rings of oxygen atoms under conditions of elevated temperature and pressure and the presence of hydrogen such that a product hydrocarbon is produced of substantially reduced organonitrogen and organosulfur content and of substantially reduced pour point in comparison to said feedstock and (2) recovering said product hydrocarbon.

24. A process as defined in claim 23 wherein said silica molecular sieve is a calcined silicalite, said elevated temperature is less than about 800° F., said pour point of said feedstock is above about 70° F., said organonitrogen content of said feedstock is between about 400 and 2000 wppm, said organosulfur content of said feedstock is between about 30 and 2000 wppm, and said product hydrocarbon contains less than about 400 wppm of organonitrogen components and less than about 25 wppm of organosulfur components and has a pour point less than about 30° F.

25. A process as defined in claim 24 wherein said catalyst comprises between about 5 and 40 weight percent of tungsten sulfides, calculated as $WO_3$, and between about 0.5 and 15 weight percent of nickel sulfides, calculated as NiO.

26. A process as defined in claim 25 wherein said feedstock contains a substantial proportion of components boiling above about 750° F. but no more than about 30%, by volume, of such components are converted in step (1) to products boiling below 750° F.

27. A process as defined in claim 26 wherein said porous refractory oxide is alumina.

28. A process as defined in claim 23 wherein said feedstock contains more than about 1.50 weight percent of organonitrogen components.

29. A process for treating a deashed, dearsenated, essentially full boiling range shale oil having a pour point above about 50° F. and containing more than about 1.50 weight percent organonitrogen compounds, calculated as nitrogen, and more than about 0.20 weight percent organosulfur compounds, calculated as sulfur, which process comprises:

(1) contacting said shale oil with a catalyst comprising a Group VIII metal component and a Group VIB metal component on a porous refractory oxide support under conditions, including an elevated temperature and pressure and the presence of hydrogen, such that sufficient of said organonitrogen compounds are converted to ammonia and sufficient of said organosulfur compounds are converted to hydrogen sulfide such that a shale oil hydrotreated product is obtained containing about 200 to 3500 wppm organonitrogen compounds, calculated as nitrogen, and about 30 to about 200 wppm organosulfur compounds, calculated as sulfur; and (2) contacting said shale oil hydrotreated product with essentially all the gases obtained in step (1), including the unreacted hydrogen and produced ammonia and hydrogen sulfide, with a catalyst consisting essentially of one or more Group VIB metal components selected from the group consisting of molybdenum, tungsten, the oxides thereof and the sulfides thereof and one or more Group VIII metal components selected from the group consisting of nickel, cobalt, the oxides thereof, and the sulfides thereof on a support consisting essentially of (a) a porous refractory oxide comprising alumina and (b) an essentially organic-free silicalite containing less than about 0.75 weight percent of total metals, calculated as metals, said contacting being under conditions, including an elevated temperature and pressure, such that said shale oil hydrotreated product is converted into a shale oil hydrodewaxed product having a pour point below about 30° F. and containing less than about 200 wppm of organonitrogen compounds, calculated as nitrogen, and less than about 25 wppm of organosulfur compounds, calculated as sulfur.

30. A process as defined in claim 29 wherein the only hydrogen available in step (2) is the unreacted hydrogen from step (1).

31. A process as defined in claim 29 wherein said catalyst in step (1) contains more than about 1 weight percent of nickel components, calculated as NiO, and more than about 5 weight percent of molybdenum components, calculated as $MoO_3$, and wherein said catalyst in step (2) contains more than about 1 weight percent of nickel components, calculated as NiO, and more than about 5 weight percent of tungsten components, calculated as $WO_3$, and wherein said elevated temperature in steps (1) and (2) is below about 800° F., and wherein said support in step (2) comprises between about 20 and 40% by weight of said silicalite.

32. A process as defined in claim 31 wherein said hydrotreated product obtained in step (1) has a pour point above about 70° F.

33. A process as defined in claim 32 wherein said hydrotreated product obtained in step (1) contains a substantial proportion of components boiling above about 750° F. and wherein less than about 25%, by volume, of such components are converted in step (2) to products boiling below 750° F.

34. A process as defined in claim 33 wherein said hydrodewaxed product obtained in step (2) contains a JP-4 fraction boiling below 420° F. and having a freeze point below −72° F. and having a stability meeting the JFTOT test.

35. A process for upgrading a waxy hydrocarbon feedstock derived from shale oil, said feedstock containing organonitrogen components and organosulfur components and having a relatively high pour point, which process comprises:

(1) hydrotreating said feedstock by contact with a sulfided catalyst comprising a Group VIII metal component and a Group VIB metal component on a porous refractory oxide support in the presence of hydrogen and under conditions reducing the organonitrogen content and the organosulfur content of the shale oil feedstock while increasing the pour point thereof;

(2) contacting at an elevated temperature below about 800° F. the entire effluent from step (1) with a catalyst comprising a Group VIII metal component and a Group VIB metal component on a support comprising a porous refractory oxide in intimate admixture with an essentially Group IIIA metal-free crystalline silica molecular sieve having channels with apertures defined by ten membered rings of oxygen atoms in the presence of hydrogen and under conditions further reducing the organonitrogen and organosulfur content while decreasing the pour point below that of said feedstock introduced into step (1); and (3) recovering a product hydrocarbon having a reduced pour point and containing a decreased concentration of organonitrogen and organosulfur components in comparison to said feedstock.

36. A process as defined in claim 35 wherein said entire effluent contains constituents boiling above about 750° F. but less than about 50% of said constituents, by volume, are converted during said contacting in step (2) to constituents boiling below 750° F.

37. A process as defined in claim 35 or 36 wherein said feedstock has a pour point above 50° F. and contains more than about 0.5 wt.% organosulfur components, calculated as sulfur, and more than about 1.5 wt.% organonitrogen components, calculated as nitrogen, and said product hydrocarbon has a pour point below 30° F. and contains less than 25 wppm organosulfur compounds, calculated as sulfur, and less than about 400 wppm organonitrogen compounds, calculated as nitrogen.

38. A process for treating a shale oil containing arsenic, ash, organosulfur compounds, and organonitrogen compounds and having a pour point above about 50° F. comprising:

(1) deashing said shale oil;

(2) dearsenating the deashed shale oil recovered from step (1) by contacting said deashed shale oil with a sulfided catalyst comprising nickel and molybdenum components on a refractory oxide support in the presence of hydrogen and at elevated temperature and pressure;

(3) hydrotreating the deashed-dearsenated shale oil recovered in step (2) by contacting said deashed-dearsenated shale oil with a catalyst comprising a Group VIB metal component and a Group VIII metal component on a porous refractory oxide in the presence of hydrogen and under conditions of elevated temperature and pressure; and (4) contacting the deashed-dearsenated-hydrotreated shale oil recovered from step (3) with a catalyst comprising a Group VIB metal and a Group VIII metal on a support comprising an intimate admixture of silicalite and a porous refractory oxide under conditions of elevated pressure and an elevated temperature no greater than about 800° F. so as to reduce the organonitrogen and organosulfur contents of said deashed-dearsenated-hydrotreated shale oil and to reduce the pour point thereof.

39. A process for treating a waxy raffinate in the production of a lubricating oil, which process comprises contacting said waxy raffinate with a catalyst comprising a Group VIII metal component and a Group VIB metal component on a support comprising a refractory oxide in intimate admixture with an essentially Group IIIA metal-free crystalline silica molecular sieve having channels with apertures defined by ten membered rings of oxygen atoms, said contacting being in the presence of hydrogen and under conditions of elevated temperature and pressure such that the pour point of said raffinate is substantially reduced.

40. A process as defined in claim 39 wherein essentially all of the components of said raffinate boil above 650° F.

41. A process as defined in claim 40 wherein said contacting is at a temperature below about 800° F.

42. A process as defined in claim 41 wherein said Group VIII metal is nickel and said Group VIB metal is tungsten.

43. A process as defined in claim 42 wherein said waxy raffinate contains more than about 400 wppm organosulfur components and has a pour point above about 80° F. and said contacting reduces said organosulfur content to below about 50 wppm and said pour point to below +30° F.

44. A process as defined in claim 42 or 43 wherein said waxy raffinate contains more than about 125 wppm organonitrogen components and said contacting reduces the organonitrogen content to below about 100 wppm.

45. A process as defined in claim 3, 4, 25, 35, 41, or 43 wherein said molecular sieve contains at least 0.15 wt.% alumina, calculated as $Al_2O_3$, but no more than 0.75 wt.% alumina, calculated as $Al_2O_3$.

46. A process as defined in claim 15, 19, 29, 31, or 34 wherein said silicalite contains at least 0.15 wt.% alumina, calculated as $Al_2O_3$, but no more than 0.75 wt.% alumina, calculated as $Al_2O_3$.

47. A process for treating a hydrocarbon feedstock derived from shale oil, said feedstock containing a JP-4 fraction consisting of essentially all components boiling below about 420° F., said JP-4 fraction having a freeze point above −72° F., which process comprises contacting said feedstock at an elevated temperature below about 800° F. and at an elevated pressure and in the presence of hydrogen with a catalyst comprising a Group VIII metal component and a Group VIB metal component on a support comprising a porous refractory oxide in intimate admixture with silicalite, said contacting being such that a product hydrocarbon is obtained, the JP-4 fraction of which has a freeze point below −72° F.

48. A process as defined in claim 47 wherein said feedstock is a hydrotreated shale oil containing less than 500 wppm of organonitrogen compounds, calculated as nitrogen.

49. A process as defined in claim 48 wherein said JP-4 fraction of said product hydrocarbon meets the JFTOT stability test.

50. A process for treating a hydrocarbon feedstock derived from shale oil, said feedstock containing a diesel fraction boiling between about 300° and 670° F. and having a pour point above +5° F., which process comprise contacting said feedstock at an elevated temperature below about 800° F. and at an elevated pressure and in the presence of hydrogen with a catalyst comprising a Group VIII metal component and a Group VIB metal component on a support comprising a porous refractory oxide in intimate admixture with silicalite, said contacting being such that a product hydrocarbon is obtained, the diesel fraction thereof boiling between about 300° and 670° F. having a pour point below +5° F.

51. A process for treating a hydrocarbon feedstock derived from shale oil, said feedstock containing a Jet A fraction consisting of components boiling between about 300° and 520° F., said Jet A fraction having a freeze point above −40° F., which process comprises contacting said feedstock at an elevated temperature below about 800° F. and at an elevated pressure and in the presence of hydrogen with a catalyst comprising a Group VIII metal component and a Group VIB metal component on a support comprising a porous refractory oxide in intimate admixture with silicalite, said contacting being such that a product hydrocarbon is obtained, the Jet A fraction thereof having a freeze point below −40° F.

52. A process as defined in claim 50 or 51 wherein said feedstock is a hydrotreated shale oil and said catalyst comprises at least 1 wt.% of nickel components, calculated as NiO, and at least 10 wt.% of tungsten components, calculated as WO$_3$, and said silicalite comprises between about 20 and 40 wt.% of said support and contains between 0.15 and 0.75 wt.% alumina, calculated as Al$_2$O$_3$.

53. In a catalytic hydrocarbon dewaxing process, wherein a hydrocarbon feedstock is contacted with a catalyst under dewaxing conditions, the improvement wherein said catalyst comprises a Group VIB metal component on a support comprising an intimate admixture of a porous refractory oxide and a silica polymorph consisting essentially of crystalline silica.

54. A process as defined in claim 53 wherein said dewaxing process also results in simultaneous denitrogenation.

55. A process as defined in claim 53 wherein said catalyst further comprises a Group VIII metal component.

56. A process as defined in claim 54 wherein said catalyst further comprises a Group VIII metal component.

57. A process as defined in claim 53 wherein said silica polymorph comprises a form of silicalite.

58. A process as defined in claim 54 wherein said silica polymorph has channels whose maximum cross-sectional dimension is between about 5 and about 6 angstroms.

59. A process as defined in claim 55 wherein said silica polymorph is a silicalite having a specific gravity at 25° C. of 1.70±0.5 g/cc and a mean refractive index of 1.39±0.01 when calcined in air for one hour at 600° C.

60. A process as defined in claim 56 wherein said silica polymorph has an X-ray diffraction pattern whose six strongest lines are as set forth in the following table, wherein S refers to strong lines and VS to very strong lines:

| d-A | Relative Intensity |
| --- | --- |
| 11.1 ± 0.2 | VS |
| 10.0 ± 0.2 | VS |
| 3.85 ± 0.07 | VS |
| 3.82 ± 0.07 | S |
| 3.76 ± 0.05 | S |
| 3.72 ± 0.05 | S |

61. A process as defined in claim 53 wherein said contacting also results in simultaneous desulfurization.

62. A process as defined in claim 53 wherein said contacting also results in simultaneous denitrogenation and desulfurization.

63. A process as defined in claim 61 wherein said catalyst further comprises a Group VIII metal component.

64. A process as defined in claim 62 wherein said catalyst further comprises a Group VIII metal component.

65. A process as defined in claim 61 wherein said silica polymorph has channels whose maximum cross-sectional dimension is between about 5 and about 6 angstroms.

66. A process as defined in claim 62 wherein said silica polymorph comprises a form of silicalite.

67. A process as defined in claim 64 wherein said silica polymorph is a silicalite having a specific gravity at 25° C. of 1.70±0.05 g/cc and a mean refractive index of 1.39±0.01 when calcined in air for one hour at 600° C.

68. A process as defined in claim 63 wherein said silica polymorph has an X-ray diffraction pattern whose six strongest lines are as set forth in the following table, wherein S refers to strong lines and VS to very strong lines:

| d-A | Relative Intensity |
| --- | --- |
| 11.1 ± 0.2 | VS |
| 10.0 ± 0.2 | VS |
| 3.85 ± 0.07 | VS |
| 3.82 ± 0.07 | S |
| 3.76 ± 0.05 | S |
| 3.72 ± 0.05 | S |

69. A process as defined in claim 53, 54, 57, 58, or 64 wherein said feedstock is derived from shale oil.

70. A process as defined in claim 53, 59, 60, 63, or 64 wherein said dewaxing is hydrodewaxing in the presence of hydrogen and said feedstock is a shale oil which was previously hydrotreated.

71. A process as defined in claim 55, 56, 60, 63, or 64 wherein said dewaxing is hydrodewaxing in the presence of hydrogen and said feedstock is an essentially full range shale oil which, prior to contact with said catalyst, has been deashed, dearsenated and catalytically hydrotreated.

72. A process as defined in claim 70 wherein said feedstock has a pour point above about 70° F. and, after contact with said catalyst, the pour point is below about 30° F.

73. A process as defined in claim 69 wherein said feedstock has a pour point above about 50° F. and, after contact with said catalyst, the pour point is below 30° F.

74. A process as defined in claim 71 wherein the pour point of said feedstock after hydrotreating is above about 70° F. and said pour point after contact with said catalyst is below 30° F., and said deashing, dearsenating, and hydrotreating are performed successively.

75. A process as defined in claim 70 wherein said Group VIB metal component comprises tungsten and said Group VIII metal component comprises nickel and the temperature during said contacting is below 800° F.

76. A process as defined in claim 69 wherein the feedstock contains a JP-4 fraction consisting of essentially all components boiling below about 420° F., said JP-4 fraction having a freeze point above −72° F., but after said contacting said JP-4 fraction has a freeze point below −72° F.

77. A process as defined in claim 71 wherein the feedstock contains a JP-4 fraction consisting of essentially all components boiling below about 420° F., said JP-4 fraction having a freeze point above −72° F., but after said contacting said JP-4 fraction has a freeze point below −72° F. and meets the JFTOT stability test.

78. A process as defined in claim 55, 59, 60, 64, 67, or 68 wherein said Group VIB metal component comprises tungsten and said Group VIII metal component comprises nickel.

79. A process as defined in claim 71 wherein (1) said Group VIB metal component comprises tungsten and said Group VIII metal component comprises nickel, (2) said feedstock has a pour point prior to contact with said catalyst above about 70° F. and after said contact the pour point is less than 30° F., (3) said feedstock contains JP-4 fraction consisting essentially of all components boiling below about 420° F., said JP-4 fraction having a freeze point above −72° F., but after contacting said JP-4 fraction has a freeze point below −72° F., (4) said feedstock contains components boiling above about 750° F. but less than about 30 percent by volume of such components are converted during said contacting to products boiling below 750° F., and (5) the temperature of said contacting is less than about 800° F.

80. A process as defined in claim 79 wherein said shale oil is derived from oil shale from the Colorado River formation or adjacent areas.

81. A process as defined in claim 80 wherein said JP-4 fraction having a freeze point below −72° F. meets the JFTOT stability test.

82. A process as defined in claim 71 wherein said feedstock contains constituents boiling above 750° F. but, during said contacting, less than 50 percent by volume of said constituents are converted to products boiling below 750° F.

83. A process as defined in claim 53 wherein said silica polymorph comprises a crystalline silica molecular sieve.

84. A process as defined in claim 83 wherein said crystalline silica molecular sieve is essentially free of Group IIIA metals.

85. A process as defined in claim 84 wherein said contacting also results in simultaneous denitrogenation.

86. A process as defined in claim 85 wherein said contacting also results in simultaneous desulfurization.

87. A process as defined in claim 84 wherein said contacting also results in simultaneous desulfurization.

88. A process as defined in claim 83, 85, or 86 wherein said catalyst further contains a Group VIII metal component.

89. A process as defined in claim 88 wherein said dewaxing is hydrodewaxing in the presence of hydrogen and said feedstock is derived from shale oil.

90. A process as defined in claim 89 wherein said feedstock is an essentially full range shale oil which, prior to contact with said catalyst, has been deashed, dearsenated, and catalytically hydrotreated.

91. A process as defined in claim 90 wherein said feedstock after hydrotreating has a pour point above about 70° F. and after contact with said catalyst said pour point is below 30° F., and said feedstock comprises constituents boiling above 750° F. but less than about 50 percent by volume thereof are converted to products boiling below 750° F. during said contacting.

92. A process as defined in claim 91 wherein said feedstock is derived from oil shale in the Colorado River formation or adjacent areas, the temperature during said contacting is below 800° F., and said feedstock contains a JP-4 fraction consisting of essentially all components boiling below about 420° F., said JP-4 fraction having a freeze point above −72° F., but after contacting said JP-4 fraction has a freeze point below −72° F.

93. A process as defined in claim 92 wherein the contacting with said catalyst converts less than 25 percent by volume of the constituents boiling above 750° F. to products boiling below 750° F. and the JP-4 fraction having a freeze point below −72° F. meets the JFTOT stability test.

94. A process as defined in claim 89 wherein said feedstock contains a Jet A fraction boiling between about 300° and 520° F., said Jet A fraction having a freeze point above −40° F., and after said contacting, the freeze point of said Jet A fraction is below −40° F.

95. A process as defined in claim 91 wherein said feedstock contains a Jet A fraction boiling between about 300° and 520° F., said Jet A fraction having a freeze point above −40° F., and after said contacting, the freeze point of said Jet A fraction is below −40° F.

96. A process as defined in claim 89 wherein said feedstock contains a diesel fraction boiling between 300° and 670° F. with a pour point above +5° F., and after said contacting, the pour point of the diesel fraction is below +5° F.

97. A process as defined in claim 91 wherein said feedstock contains a diesel fraction boiling between 300° and 670° F. with a pour point above +5° F., and after said contacting, the pour point of the diesel fraction is below +5° F.

98. A process as defined in claim 53, 55, 56, 59, 60, 67, 68, 83, 84, 85, 86, 87, or 88 wherein said porous refractory oxide comprises a dispersion of silica-alumina in alumina.

99. A process as defined in claim 98 wherein said feedstock is a waxy raffinate.

100. A process for hydrodewaxing a hydrocarbon feedstock, which process comprises contacting said feedstock with a catalyst comprising a hydrogenation component comprising a Group VIB metal component and a Group VIII metal component on a support comprising an intimate admixture of a porous refractory oxide and silicalite under conditions, including elevated temperature and pressure and the presence of hydrogen, sufficient to hydrodewax said hydrocarbon feedstock, wherein at least a portion of said hydrogenation component is associated with said porous refractory oxide.

101. A hydroprocessing process which comprises contacting a hydrocarbonaceous feed at hydrocarbon hydroprocessing conditions with a catalyst comprising an effective amount of a crystalline silica zeolite having uniform pore diameters, a hydrogenation component and a non-zeolitic inorganic oxide support, said hydrogenation component being associated with said support, wherein said hydroprocessing comprises simultaneous hydrodesulfurization and pour point reduction.

102. A hydroprocessing process which comprises contacting a hydrocarbonaceous feed at hydrocarbon hydroprocessing conditions with a catalyst comprising an effective amount of a crystalline silica zeolite having uniform pore diameters, a hydrogenation component and a non-zeolitic inorganic oxide support.

* * * * *

UNITED STATES PATENT AND TRADEMARK OFFICE
CERTIFICATE OF CORRECTION

PATENT NO. : 4,790,927

DATED : December 13, 1988

INVENTOR(S) : John W. Ward and Timothy L. Carlson

It is certified that error appears in the above-identified patent and that said Letters Patent is hereby corrected as shown below:

Col. 26, claim 69, line 30, the number "64" should be --66--.

Col. 26, claim 70, line 32, the number "53" should be --56--.

Col. 26, claim 71, line 36, the number "56" should be --59--.

Signed and Sealed this

Third Day of September, 1991

Attest:

HARRY F. MANBECK, JR.

*Attesting Officer*      *Commissioner of Patents and Trademarks*